(No Model.) 2 Sheets—Sheet 1.

C. SILL.
ELECTRIC RAILROAD.

No. 567,517. Patented Sept. 8, 1896.

WITNESSES:
Edward Thorpe

INVENTOR
C. Sill
BY Munn & Co.
ATTORNEYS.

(No Model.) 2 Sheets—Sheet 2.
C. SILL.
ELECTRIC RAILROAD.
No. 567,517. Patented Sept. 8, 1896.
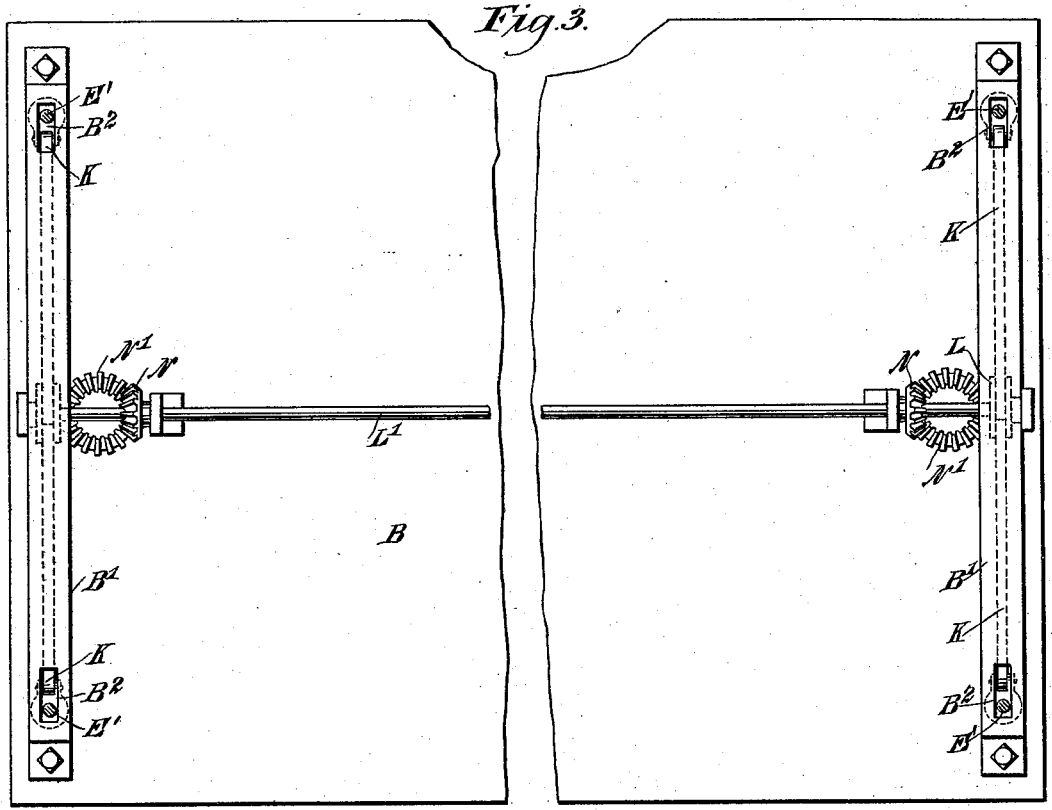
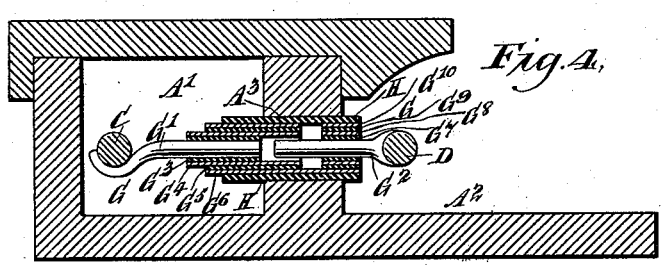
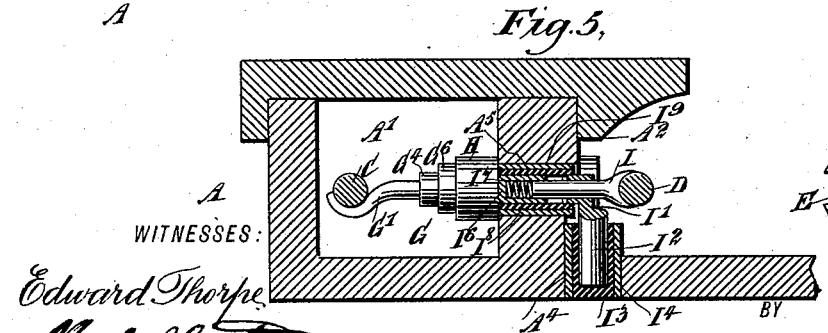
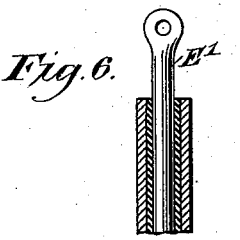
WITNESSES:
Edward Thorpe
Theo. G. Hoster
INVENTOR
C. Sill
BY
Munn & Co
ATTORNEYS.

UNITED STATES PATENT OFFICE.

CHARLES SILL, OF NEW YORK, N. Y.

ELECTRIC RAILROAD.

SPECIFICATION forming part of Letters Patent No. 567,517, dated September 8, 1896.

Application filed November 1, 1895. Serial No. 567,581. (No model.)

*To all whom it may concern:*

Be it known that I, CHARLES SILL, of New York city, in the county and State of New York, have invented new and useful Improvements in Electric Railroads, of which the following is a full, clear, and exact description.

The object of the invention is to provide new and useful improvements in electric railroads, whereby overhead conducting-wires and the underground duct are dispensed with, and the electricity from the conductor is properly passed to the motor in the car, all leakage of electricity is prevented, and accidents to persons or animals in crossing the tracks are entirely obviated.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the views.

Figure 1:
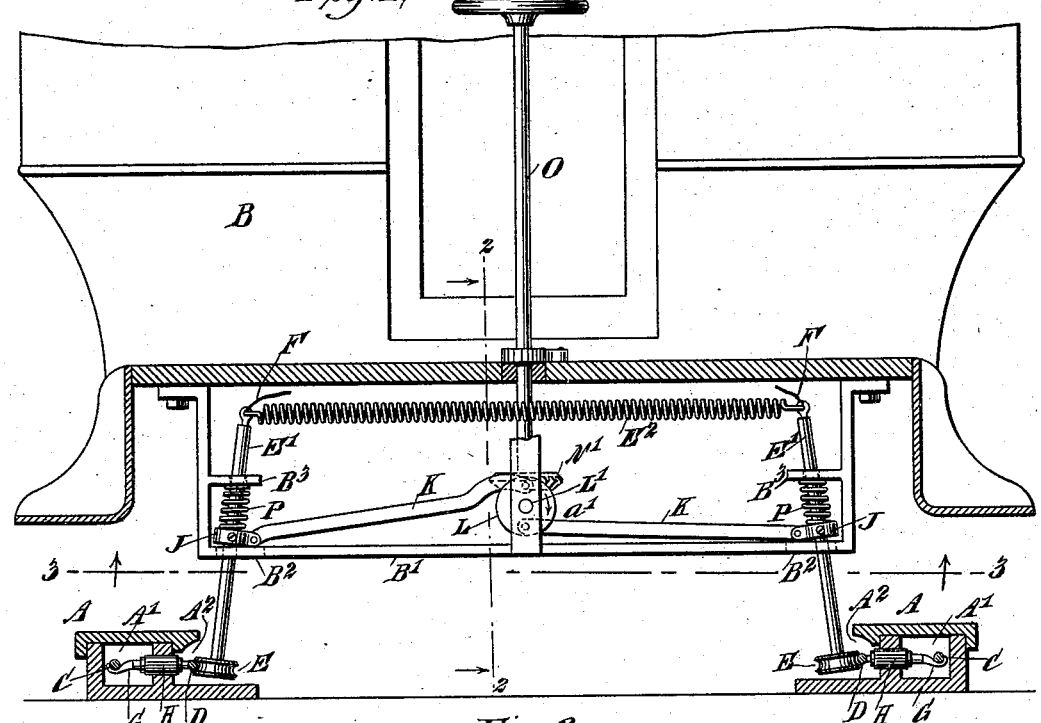
Figure 2:
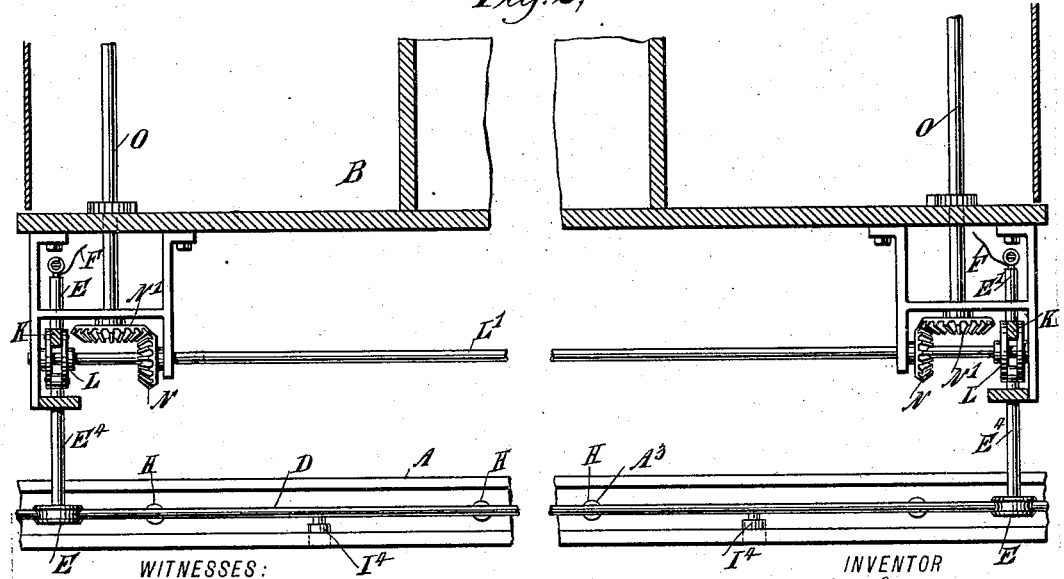

Figure 1 is a cross-section of the improvement. Fig. 2 is a longitudinal section of the same on the line 2 2 of Fig. 1. Fig. 3 is an inverted sectional plan view of the same on the line 3 3 of Fig. 1. Fig. 4 is an enlarged cross-section of the rail, the conductor, the trolley-wire, and the connection between the same. Fig. 5 is a similar view of the support for the trolley-wire, and Fig. 6 is an enlarged sectional side elevation of the trolley-wheel.

The improved electric railroad is provided with the track-rails A, on which travel the wheels of the car B, the said rails being preferably of the construction shown and described in the Letters Patent of the United States, No. 532,293, granted to me January 8, 1895. Each rail A is provided with a longitudinal duct A', in which extends the conductor C, connected with a suitable source of electrical supply, and on the inner side of the rail is formed a recess A², in which extends the sectional trolley-wire D, engaged by the trolley-wheel E, mounted to rotate loosely on the rod E', extending upward and held in a suitable bracket B', attached to the under side of the car. The upper ends of the rod E' are preferably connected by a spring E², (see Fig. 1,) and are also connected to wires F, leading to the motor on the car B, so that the electricity can be conducted from the conductor C to the motor as the car travels along on the rails A.

The conductor C and the trolley-wire D are normally disconnected from each other and are automatically connected as the car passes along the track. For this purpose a contact making and breaking device G is arranged in the conduit A', and consists principally of a rod G', connected to the conductor C, and a rod G², connected to the trolley-wire D. The two rods G' and G² are normally held apart by a spring H, preferably formed of a rubber tube fitted in an aperture A³, formed in the inner web of the rail A, as shown in Fig. 4.

The rod G' is embedded at its free end in a circular layer of cement G³, held in a short tube G⁴, fastened on its outside by a layer of cement G⁵, concentric with the metallic tube G⁶, fitted in the inner end of the spring H, as is plainly illustrated in Fig. 4. The rod G² is likewise embedded at or near its middle in a layer of cement G⁷, held in a tube G⁸, connected by a layer of cement G⁹ with a short tube G¹⁰, fitted in the outer end of the spring H. The adjacent ends of the tubes G⁶ and G¹⁰ are a suitable distance apart, as is plainly shown in Fig. 4, and within the web of the rail, so that the spring H can give sufficiently to bring the inner ends of the rods G' and G² in contact with each other whenever a lateral pressure is exerted on the trolley-wire D. The spring H normally holds the rods G' and G² out of contact; but when the trolley-wheel E passes this section of the rail and is pressed inward by a mechanism hereinafter more fully described the rod G² moves in engagement with the rod G', as they are in alinement, and consequently an electric connection is made between the conductor C and the trolley-wire D. Electricity can now flow from the conductor C to the motor on the car B.

The trolley-wire D is supported on the rail A in the manner shown in Fig. 5, the said trolley-wire being attached at suitable intervals to a transversely-extending rod I, fitted to slide loosely in a bearing I', formed on the upper end of a rod I², embedded in cement I³, held in a tube I⁴, set into an opening A⁴ in the base of the rail. The inner end of the rod I extends loosely into a cap I⁶, containing a spring I⁷, the said cap being set in cement $I^8$, held on the inside of a tube $I^9$, secured in an opening $A^5$, formed in the inner web of the rail A. Now it will be seen that by this arrangement the rods I and the trolley-wires D are supported in the recesses $A^2$, and said wires are free to yield transversely when the pressure is exerted in a lateral direction by the trolley-wheel E. It will also be seen that by the arrangement described for making the connection between the conductor C and the trolley-wire D and by the device for supporting the latter a complete insulation is assured and at the same time all moisture is excluded from the duct A', thus preventing leakage of electricity from the conductor.

The cement used for fastening the rods G', $G^2$, and $I^2$ and the several tubes in place is preferably composed of oxid of zinc mixed with chlorid of zinc to form a paste, the paste being immediately applied after mixing, and when in position it quickly crystallizes and becomes very hard, waterproof, withstands great heat, and is a non-conductor.

In order to connect the trolley-wheel E with the trolley-wire D and disconnect it from the same, I journal the rod E' on each wheel in a sleeve $E^3$, (see Fig. 6,) made of a non-conducting material and held in a sleeve $E^4$, extending through a slot $B^2$ in the bracket B', and also engaging an opening in an arm $B^3$, projecting from said bracket. (See Fig. 1.) On this external sleeve $E^4$ is secured a ring J, pivotally connected by a rod K with a crank-disk L, secured on a shaft L', journaled in suitable bearings in the bracket B'. (See Figs. 1, 2, and 3.) The shaft L' extends longitudinally under the car and is provided near its ends with bevel gear-wheels N, meshing with bevel gear-wheels N', secured on the lower end of the staffs O, extending upward from the car-platform and under the control of the motorman.

When the staff O is turned in one direction, a rotary motion is given to the shaft L' to turn the crank-disk L in the direction of the arrow a', (see Fig. 1,) and thus pull the rods K inward toward each other and cause the trolley-wheels E to move out of engagement with the trolley-wires D. When the staff O is turned in the opposite direction, the reverse movement takes place and the wheels E press the trolley-wires D laterally, until the rod $G^2$ makes contact with the rod G'.

Since the trolley-wires D are made sectional, it will be understood that as soon as the car has passed off one of the sections the springs H and I' will act to force the rods whereon the trolley-wires of that section are carried away from the rods whereon the line conductors C are carried, so as to break the contacts and place the trolley-wires of that section out of circuit with the line conductors. In this way it will be seen that all sections of the trolley-wires are cut out and remain dead, except when a car is passing over them.

The upper ends of the rods E' are connected with each other by the springs $E^2$, so as to normally hold the wheels E in contact with the trolley-wires D with sufficient pressure to establish connection between the rods $G^2$ and G'.

In order to permit the wheels E to yield upwardly in case of striking a stone in the opening $A^2$ in the rail A, I provide the spring P, pressing with its lower end on the ring J and resting with its upper end on the under side of the bracket-arm $B^3$.

As illustrated in Fig. 2, the supports for the trolley-wire D alternate with the connections between the trolley-wire and the conductor C, but I do not limit myself to this particular arrangement.

Having thus described my invention, I claim as new and desire to secure by Letters Patent—

1. An electric railroad comprising switches provided with insulation, consisting of tubes, and alternate layers of cement, the said layers and tubes one arranged within the other, substantially as shown and described.

2. An electric railroad comprising switches provided with insulation consisting of tubes, and alternate layers of cement, and a flexible tube receiving the outermost tube of said insulation, substantially as shown and described.

3. In an electrical-railway system, the combination of track-rails, insulated lead and return conductors extending along the track-rails, rods mounted to slide transversely of the track-rails and into and out of contact with the lead and return conductors, sectional trolley-wires carried on said rods, a motor-car movable along the track, shafts on the car and mounted to swing transversely thereof, contacts on said shafts to engage the trolley-wires, a crank-disk carried on the car, means to turn the same, and rod connections between the crank-disk and the levers carrying the contacts, substantially as set forth.

4. In an electrical-railway system, the combination of track-rails, insulated lead and return conductors extending along the same, rods mounted to slide transversely to the track-rails into and out of contact with said lead and return conductors, sectional trolley-wires carried on the rods, a motor-car movable along the track, pivoted shafts on the car, and mounted to swing in planes transverse to the track, wheels on the shafts engaging the trolley-wires, a spring connecting the shafts and tending to hold said wheels engaged with the trolley-wires, and means to move the wheels out of engagement with the trolley-wires, substantially as set forth.

CHARLES SILL.

Witnesses:
THEO. G. HOSTER,
JNO. M. RITTER.